Aug. 15, 1944.    J. T. ATWOOD    2,355,695
COUPLER
Filed Dec. 2, 1942    3 Sheets-Sheet 1
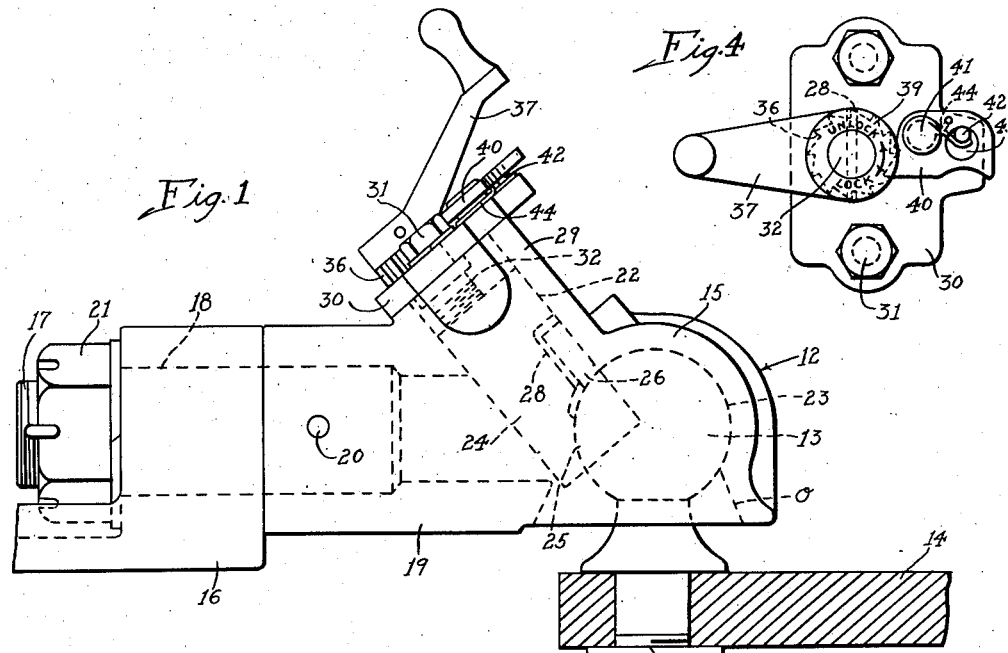
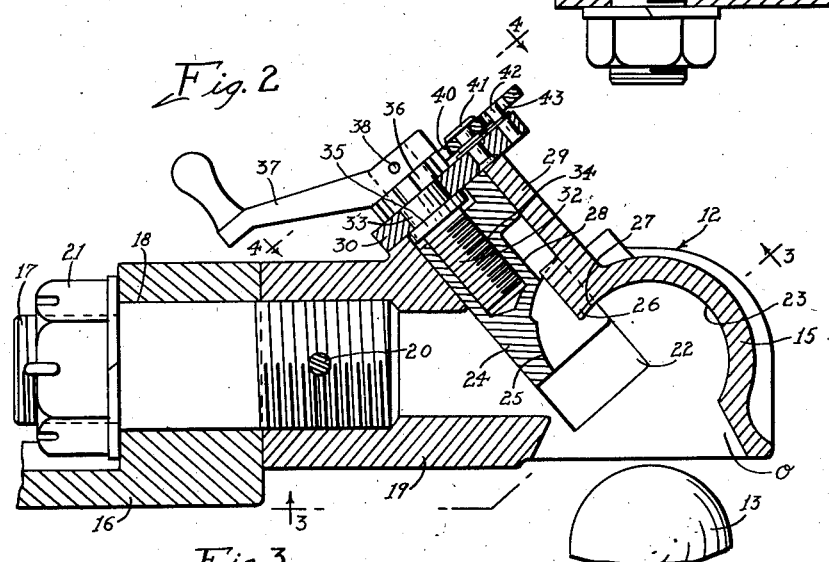
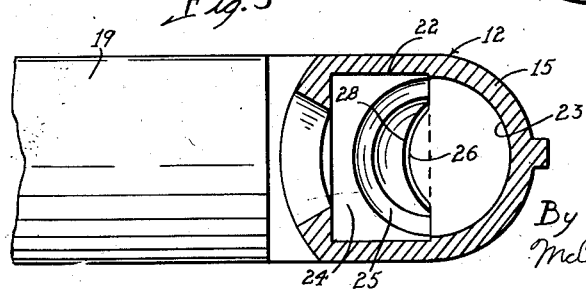
Inventor:
James T. Atwood
By McCanna, Wintercorn & Mousbach
Attys.

Aug. 15, 1944.    J. T. ATWOOD    2,355,695
COUPLER
Filed Dec. 2, 1942    3 Sheets-Sheet 2
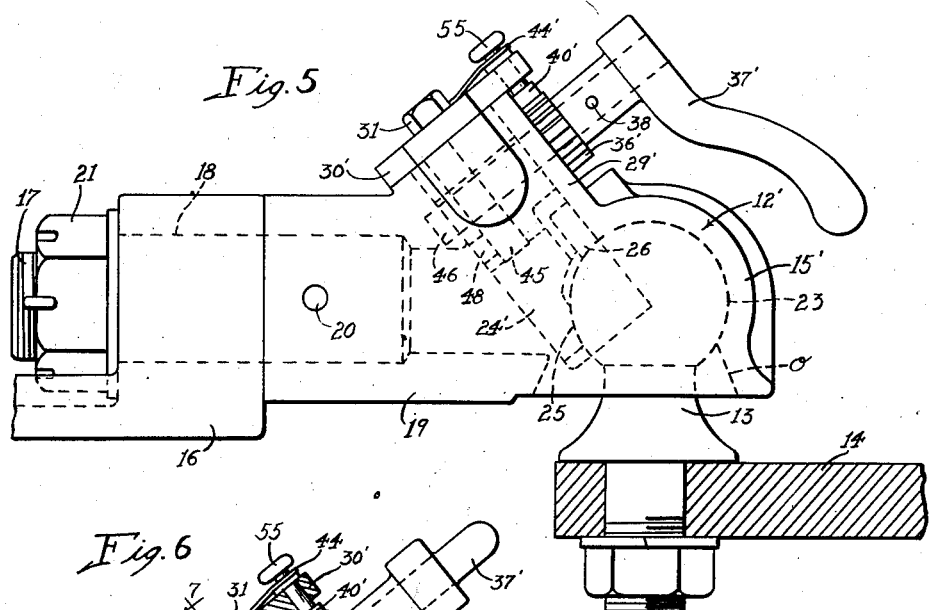
Inventor:
James T. Atwood
By McCanna, Wintercorn & Morsbach
Attys.

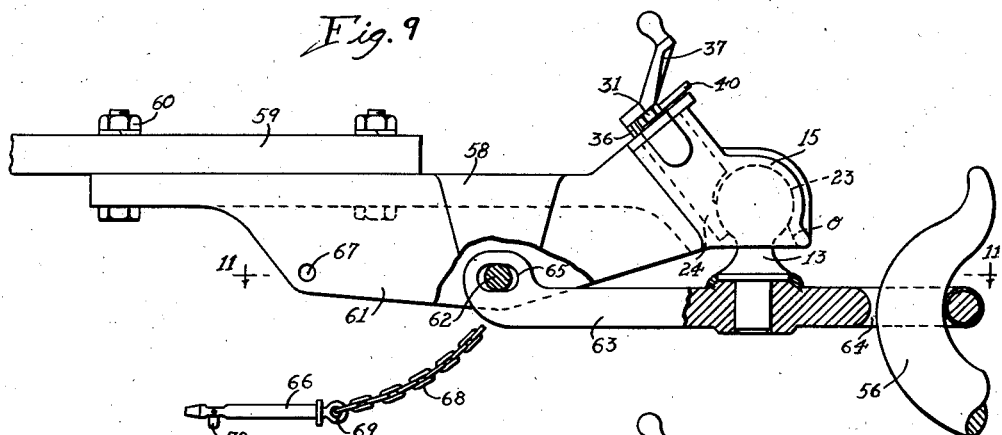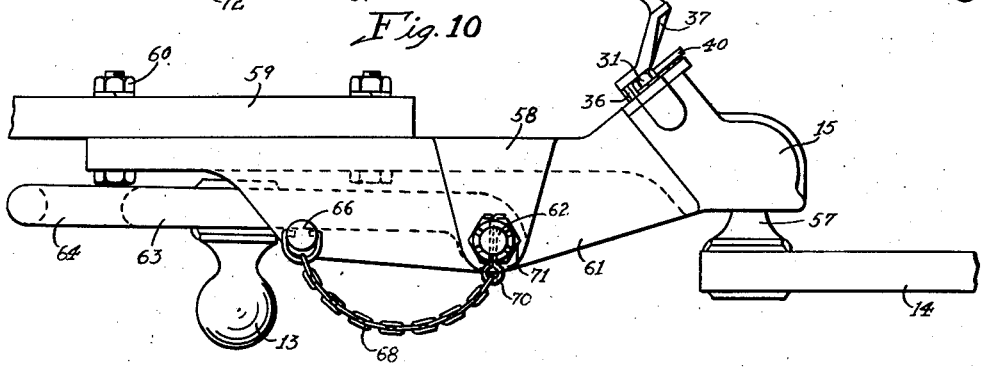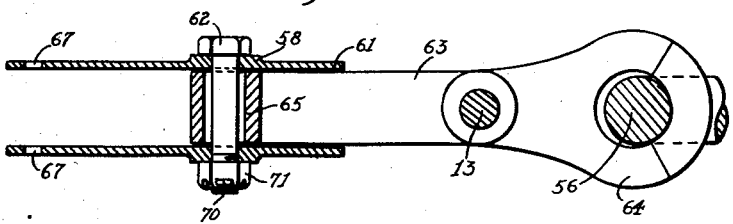

Patented Aug. 15, 1944

2,355,695

UNITED STATES PATENT OFFICE 2,355,695

COUPLER

James T. Atwood, Rockford, Ill., assignor to The Atwood Vacuum Machine Company, a copartnership composed of Seth B. Atwood and James T. Atwood, Rockford, Ill.

Application December 2, 1942, Serial No. 467,607

18 Claims. (Cl. 280—33.17)

This invention relates to couplers of the ball and socket type, and more specifically of the type disclosed in Dayton patents, 2,090,113 and 2,166,208.

The couplers disclosed in the Dayton patents, while satisfactory for use with the ordinary house-type trailer, are not suitable for use with mobile artillery, because, whereas in the house-type trailer coupler it is desirable, in the event of accidental over-turning of the trailer, to have the ball retaining plunger free to back away against spring pressure and permit uncoupling of the trailer so as not to endanger the towing vehicle, such operation is not at all desirable in the case of mobile artillery. It is, therefore, one of the principal objects of my invention to provide a coupler of the type mentioned, in the preferred form of which the ball retaining plunger is advanced and retracted by a jack-screw, so that any thrust of the ball head against the plunger in an uncoupling direction is assumed by the jack-screw and back-up movement of the plunger is positively prevented, the screw being moreover arranged to be operated by a hand crank permanently affixed to the outer end of the screw for quick and easy operation of the plunger in either direction, and the screw being also arranged to be locked positively in adjusted position by means of a pawl and ratchet so that there is no danger of the movable parts moving accidentally due to vibration. In another form, the ball retaining plunger is operable positively in both directions by means of a rotary cam that is adapted to be locked positively in adjusted position by a pawl and ratchet mechanism, the cam serving to move the plunger toward coupling position and to hold it positively in such position, and having a pin projection on one side thereof arranged to engage in a notch in the plunger to back up the plunger when the cam is turned in the opposite direction. The screw also has the advantage over a spring of permitting definite surface to surface contact between the plunger and the ball regardless of wear, so that undesirable play is eliminated and better performance is obtained all around.

Another objection to the ball and socket type couplers has been that too much of the thrust is assumed by the movable ball retaining plunger, and it is, therefore, another important object of my invention to provide a socket member in which there is a plunger receiving bore at approximately a forty-five degree (45°) angle opening into the socket in the conventional manner, but the socket member is formed with a projection on one side of the plunger bore, the inner end of which forms a continuation of the spherical inner surface of the socket, whereby to provide much needed additional bearing surface for the ball head in the socket and accordingly relieve the plunger of a sizeable fraction of the thrust to which it was otherwise subjected, the plunger itself being cut away on one side to accommodate the aforesaid projection.

Another important object of my invention is to provide an improved coupler hitch usable interchangeably with towing vehicles equipped with ball heads or hooks, the hitch having a socket member to receive a ball head on the towing vehicle in the usual manner, and also having an arm pivoted on the socket member and equipped with an eye on the outer end thereof to receive a hook on the towing vehicle, the arm being equipped with an extra ball head to enter the socket when the eye is used for coupling purposes and act as a seal to exclude dust and dirt from the socket in addition to transmitting the pull, the arm and ball head thereon being swingable to and out-of-the-way position and arranged to be locked releasably in such position when not in use.

The invention is described hereinafter by reference to the accompanying drawings, wherein—

Fig. 1 is a side view of a coupler made in accordance with my invention;

Fig. 2 is a longitudinal section through the coupler, showing the plunger retracted and the ball head in disengaged relation to the socket;

Fig. 3 is a cross-section on the line 3—3 of Fig. 2, looking in the direction of the arrows;

Fig. 4 is a view taken on the line 4—4 of Fig. 2;

Fig. 5 is a side view of another coupler made in accordance with my invention;

Fig. 6 is a longitudinal section through said coupler with the plunger retracted and the ball head disengaged;

Fig. 7 is a section on the line 7—7 of Fig. 6;

Fig. 8 is an outside view taken in a plane parallel to the line 7—7;

Figs. 9 and 10 are two side views of a hitch equipped with the coupler of Figs. 1 to 4, illustrating its two alternative uses, and Fig. 11 is a horizontal section on the line 11—11 of Fig. 9.

Similar reference numerals are applied to corresponding parts throughout the views.

Referring first to Figs. 1 to 4, the coupler indicated generally by the reference numeral 12 comprises a ball head member 13, carried on a bracket 14 attached to a towing vehicle, and a socket member 15 carried on a part 16 attached to the tongue of the trailer. The latter, as previously indicated, may be a mobile artillery piece, inasmuch as the present coupler is especially designed for such use, although it is, of course, suitable for general use wherever this ball and socket type of couplers is or may be suitable. Pivotal movement between the socket member 15 and part 16 is permitted due to the fact that the stud 17 on the socket member has a swivel fit in the bearing 18 on the part 16. The stud 17 is threaded in the shank 19 of the socket member and locked permanently in place with a pin 20. Removal of the nut 21 from the outer end of the stud permits removal and replacement of the socket member in the event of wear or breakage. The socket member 15 has an angularly inclined bore 22 communicating with the socket 23 and slidably receiving a ball retaining plunger 24. The inner end of the plunger 24 has a spherical-shaped depression 25, which conforms to the ball 13, like the socket 23, and when the plunger is in the position indicated in Fig. 1 restricting the opening o of the socket, it retains the ball in the socket and the depression 25 constitutes a continuation of the spherical inner contour of the socket. In accordance with my invention, a segmental-shaped projection 26 is provided in the socket member 15 in one side of the bore 22, the inner end 27 of which has a spherical-shaped depression flush with the spherical contour of the socket, so as to constitute a continuation of said contour and accordingly provide much needed additional area bearing surface engagement between socket 23 and the ball head 13 and proportionately reduce the area of bearing surface engagement between the ball head 13 and the plunger 24, the latter being cut away on one side, as indicated at 28, to provide working clearance for the projection 26. Where excessive loads are imposed upon a coupler, as in the military service mentioned, the additional bearing surface area afforded at 26 is of great importance, but, of course, the addition of this bearing surface area in any coupler would mean greater durability. In heavy duty installations of any kind, the transfer of bearing surface from the plunger to the socket member, as herein disclosed, is desirable not only from the standpoint of greater durability but also greater safety, regardless of the means employed for operating the ball retaining plunger, because in the event the plunger has spring means for holding it in its operative position, the thrust may be sufficient under certain conditions to overcome the spring pressure and allow the ball head to be released from the socket. The surface 25 on the plunger 24 has contact with the ball head throughout a sufficient area below the center of the ball head to retain the ball head in the socket when the plunger is in the operative position illustrated in Fig. 1. When the plunger is retracted, as shown in Fig. 2, the ball head may be entered in or withdrawn from the socket.

The hollow extension 29 of the socket member 15 in which the plunger bore 22 is provided has a plate 30 closing the outer end thereof and secured in place by screws 31. A jack-screw 32 is mounted for rotation in a bearing 33 in the plate 30, and is threaded in a hole 34 provided in the plunger 24 extending lengthwise of the latter. An annular flange 35 on the smooth shank portion of the screw has abutment with the bottom of the plate 30 to prevent endwise movement of the screw with respect to the plate in one direction, and a ratchet wheel 36, preferably formed as an integral part of the hub portion of a hand crank 37 that is pinned on the projecting outer end of the screw 32, has abutment with the top of the plate 30 to prevent endwise movement of the screw in the other direction. The screw threads are of small enough pitch to eliminate any likelihood of the plunger 24 being forced to back up under pressure of the ball head, but, on the other hand, are of large enough pitch to permit movement of the plunger from one extreme position to the other with a few turns of the crank. The screw is turned in a clockwise direction to lock the ball head in place, and in a counterclockwise direction to unlock the same, as indicated by the markings on the face of the hub portion of the crank 37 at 39 (Fig. 4). A spring pressed pawl 40 cooperating with the ratchet 36 serves to lock the screw 32 in adjusted position so that there will be no danger of the screw turning due to vibration and thus accidentally releasing the ball head. The pawl is pivoted on a pin 41 fixed on the plate 30. Another pin 42 in spaced parallel relation to the pin 41 projects freely through a hole 43 in the pawl 40 and serves the double purpose of limiting oscillatory movement of the pawl 40 by cooperation with the hole 43 and acting as an abutment for one end of the spring 44 which urges the pawl 40 normally into engagement with the ratchet. In locking the ball head, the pawl 40 may or may not be held disengaged, but in unlocking the ball the pawl will necessarily have to be held disengaged.

The coupler 12' shown in Figs. 5 to 8 is generally similar to that just described, and corresponding parts have been numbered accordingly. The plunger 24' has a cut-away portion 28 to provide operating clearance for the projection 26, but is otherwise of different form from the plunger 24, being designed for operation by means of a cam 45 instead of a jack-screw. The cam 45 is nearly semi-circular in form, as indicated in Figs. 7 and 8, the portion a being concentric with the shaft 46 on which the cam is pinned, as indicated at 47, and the portion b being eccentric relative to the shaft, and the connecting portion c between the end of the portion a and the large radius end of portion b being flat and substantially parallel to the flat side d. A pin 48 projects from one side of the cam 45 in the portion b and is adapted to enter a notch 49 in one wall 50 of the forked shank portion 51 of the plunger 24' in which the cam 45 has a working fit. The forked shank portion 51 is slotted lengthwise, as indicated at 52, to permit reciprocatory movement of the plunger 24' with respect to the shaft 46 in the turning of the cam 45 between the positions shown in Figs. 7 and 8. A plate 30' closes the outer end of the bore 22 and is fastened in place by screws 31. This plate serves as an abutment for portion a of the cam 45 when the plunger 24' is in its operative position, as illustrated in Figs. 5 and 8, so that the thrust of the ball head against the plunger is not assumed alone by the shaft 46 and its bearings 53 and 54 in the hollow extension 29' of the socket member. When the cam is turned in a clockwise direction, as viewed in Fig. 7, to move the plunger to operative position, its movement is limited to approximately 90° by engagement of the pin 48 with the left side of the slot 52 in the shank portion 51 of the plunger, and when the cam is turned in a counterclockwise direction, as viewed in Fig. 8, its movement is limited to 90° by engagement of the flat portion c with the bottom of the cover plate 30' as well as by the engagement of the end of the shank portion 51 of the plunger with the cover plate. In this counterclockwise movement of the cam 45 the pin 48 enters the notch 49 and withdraws the plunger to the retracted position shown in Fig. 7. A ratchet wheel 36', which is preferably an integral portion of the hub of the lever 37' pinned to the projecting outer end of the shaft 46, as at 38, cooperates with a pawl 40' to lock the plunger 24' releasably in either extreme position. The pawl 40' is normally held engaged with the ratchet by means of a leaf spring 44' that is reciprocable in a hole in the plate 30' and equipped with a knob 55 on its outer end for holding the same in retracted position against spring pressure when the lever 37' is turned in a counterclockwise direction to retract the plunger 24'. The pawl may or may not be held retracted in the clockwise movement of the lever 37'. The operation of this coupler is otherwise substantially the same as the other, and substantially the same advantages are derived.

Referring now to Figs. 9, 10, and 11, the hitch illustrated in these views is adapted for use interchangeably with a hook 56 on the towing vehicle or a ball head 57 on a towing vehicle. The coupler socket 15 forming a part of this hitch is identical with the socket 15 of the coupler 12, shown in Figs. 1 to 4, and is equipped with the same form of ball retaining plunger 24, operable by means of a screw arranged to be turned by a crank 37 and locked by means of a pawl 40 cooperating with a ratchet wheel 36, as described in connection with the description of Figs. 1 to 4. However, it will be understood that I may employ the coupler socket 15' and ball retaining plunger 24', disclosed in Figs. 5 to 8, or, for that matter, any other suitable ball and socket type coupler socket. The frame 58 of the hitch on which the socket 15 is suitably cast as an integral part is attached to the tongue 59 of the trailer as by means of bolts 60. The frame 58 is of inverted channel-shaped cross-section, and the downwardly projecting longitudinal flanges 61 have a bolt 62 extending therethrough to provide a pivotal support for an arm 63, on the free end of which is formed an eye 64 to receive the hook 56, as illustrated in Fig. 9. A ball head 13 is also mounted on the arm 63 intermediate its ends, and is adapted to be entered in the socket 15 and locked therein by the ball retaining plunger 24 when the ring 64 is being used for coupling purposes, as also appears in Fig. 9. In that way the socket 15 is sealed against entrance of dust and dirt and the ball head rigidly connects the arm 63 and frame 58 to transmit the pull from the eye 64 to the tongue 59 more or less independently of the pivot bolt 62, the latter serving merely to support the rear end of the arm 63 against up and down movement. The bearing hole 65 in the pivoted end of the arm 63 is elongated sufficiently to allow the required small amount of endwise movement of the arm in entering and removing the ball head from the socket. When the towing vehicle is equipped with a ball head 57 of the same size and shape as the ball head 13 for entry in the socket 15 interchangeably with the ball head 13, the ball head 13 is withdrawn from the socket and the arm 63 is swung away to an out-of-the-way position and the ball head 57 is entered in the socket, as illustrated in Fig. 10, thus providing the usual direct coupling connection instead of through the medium of the arm 63. A pin 66 is provided for entry through registering holes 67 in the flanges 61 of the hitch frame 58 to support the arm 63 in its retracted out-of-the-way position, and a chain 68 attached to an eye 69 on one end of the pin permanently connects the pin with the frame 58 in any suitable manner so that there will be no likelihood of its being lost or mislaid. The chain 68 is shown attached to the eye end of a cotter-pin 70 for locking the nut 71 on the bolt 62, but the chain may be attached directly to the frame, if desired. A pivoted keeper 72 on the free end of the pin 66 serves to retain the pin in the holes 67 against accidental displacement. The pin 66 is usually inserted in the holes 67 even when not serving to support the arm 63, so that it will not be swinging freely and striking against parts when the trailer is in transit.

It is believed the foregoing description conveys a good understanding of the objects and advantages of my invention. The appended claims have been drawn to cover all legitimate modifications and adaptations.

I claim:

1. A coupler of the class described, comprising, in combination, a ball, a socket member having a socket and a ball receiving opening, the socket member also having an extension with a bore therein communicating with the socket and angularly disposed with respect to the direction of admission of the ball, a ball locking plunger slidable in said bore toward and away from engagement with the ball in the socket, said plunger restricting said opening while engaging the ball, whereby to prevent withdrawal thereof from the socket, a plate attached to the outer end of said extension closing the outer end of the bore, a shaft extending transversely with respect to the bore and mounted for rotation in said extension of the socket member in closely spaced parallel relation to said plate, a cam fixed on said shaft in said bore for rotation, means for manually turning the shaft, said plate providing an abutment surface on the inner side thereof, and said cam being formed for engagement with said surface when turned to a position holding the plunger in engagement with the ball in the socket, whereby thrust of the ball on the plunger is transmitted through the cam to said plate, and said plunger providing an abutment thereon engaged by the cam in ball locking position for positively limiting retracting movement of the plunger under thrust of the ball thereon.

2. A coupler as set forth in claim 1, including a ratchet wheel fixed to and turning with the shaft in the manual rotation thereof, and a spring pressed manually retractable pawl mounted on the cover plate releasably engaging said ratchet wheel to lock the shaft against turning in a direction to retract the plunger.

3. A coupler of the class described, comprising, in combination, a ball, a socket member having a socket and a ball receiving opening, the socket member also having an extension with a bore therein communicating with the socket and angularly disposed with respect to the direction of admission of the ball, a ball locking plunger slidable in said bore toward and away from engagement with the ball in the socket, said plunger restricting said opening while engaging the ball, whereby to prevent withdrawal thereof from the socket, a shaft extending transversely with respect to the bore and mounted for rotation in said extension of the socket member, a cam fixed on said shaft in said bore for rotation, means for manually turning the shaft, an abutment on said plunger for sliding engagement of the peripheral portion of said cam thereon in the movement of the plunger into engagement with the ball in the socket, whereby said cam in the operative position of the plunger positively limits retracting movement of the plunger under thrust of the ball thereon, and a pin projection on one side face of the cam engageable in a recess provided therefor in the plunger and arranged to coact with said recess in the retracting movement of the plunger.

4. A coupler as set forth in claim 3, including means for releasably locking the shaft against turning.

5. A coupler as set forth in claim 3, including a ratchet wheel fixed to and turning with the shaft in the manual rotation thereof, and a spring pressed manually retractable pawl releasably engaging said ratchet wheel to lock the shaft against turning in a direction to retract the plunger.

6. A coupler as set forth in claim 3, including a cover plate attached to the outer end of the extension on said socket member closing the outer end of the bore, said cover plate providing an abutment surface on the inner side thereof, and said cam being formed for engagement with said surface when turned to a position holding the plunger in engagement with the ball in the socket, whereby thrust of the ball on the plunger is transmitted through the cam to the cover plate.

7. A coupler of the class described, comprising, in combination, a ball, a socket member having a socket and a ball receiving opening, the socket member also having an extension with a bore therein communicating with the socket and angularly disposed with respect to the direction of admission of the ball, a ball locking plunger slidable in said bore toward and away from engagement with the ball in the socket, said plunger restricting said opening while engaging the ball, whereby to prevent withdrawal thereof from the socket, a projection extending toward the plunger provided on said socket member in one side of the bore of said extension, said plunger having a recess on that side thereof toward the projection to accommodate the same and permit free reciprocation of the plunger with respect thereto, the inner end of said projection being conformed to the curvature of the socket in the socket member and forming a continuation thereof to assume thrust of the ball thereon which would otherwise be transmitted from the ball to the plunger, and means for operating said plunger and holding the same in a position restricting said socket opening.

8. A coupler of the class described, comprising, in combination, a ball, a socket member having a socket and a ball receiving opening, the socket member also having an extension with a rectangular bore therein communicating with the socket and angularly disposed with respect to the direction of admission of the ball, a ball locking plunger of rectangular cross-section having a working fit in said bore and slidable therein toward and away from engagement with the ball in the socket, said plunger restricting said opening while engaging the ball, whereby to prevent withdrawal thereof from the socket, a segmental-shaped projection extending toward the plunger provided on said socket member in one side of the bore of said extension, said plunger having a segmental-shaped recess on that side thereof toward the projection to accommodate the same and permit free reciprocation of the plunger with respect thereto, the inner end of said projection being conformed to the curvature of the socket in the socket member and forming a continuation thereof to assume thrust of the ball thereon which would otherwise be transmitted from the ball to the plunger, and means for operating said plunger and holding the same in a position restricting said socket opening.

9. A coupler assembly of the character described, comprising, in combination, a socket member having a socket and a ball receiving opening, a support for said socket member on one of two vehicles to be coupled, said socket being adapted to receive a ball head on the other of the vehicles to be coupled, means for releasably locking a ball head in said socket in swiveled relation to the socket member, a coupler hook on a vehicle to be coupled with the first mentioned vehicle, an eye member for detachable engagement on the hook, means for supporting the eye member on the first mentioned vehicle independently of and at a point spaced from the socket member, and a ball head on the eye member extending therefrom in a direction for releasable locking engagement in the aforesaid socket to transmit the pull more or less independently of said eye member supporting means between the hook and socket support when the vehicles are coupled.

10. A coupler assembly of the character described, comprising, in combination, a socket member having a socket and a ball receiving opening, a support for said socket member on one of two vehicles to be coupled, said socket being adapted to receive a ball head on the other of the vehicles to be coupled, means for releasably locking a ball head in said socket in swiveled relation to the socket member, a coupler hook on a vehicle to be coupled with the first mentioned vehicle, an eye member for detachable engagement on the hook, a ball head on the eye member extending therefrom in a direction for releasable locking engagement in the aforesaid socket to transmit the pull between the hook and socket support when the vehicles are coupled, an arm rigid with the eye member and ball head, and means for pivotally supporting said arm on the socket member support so that the ball head is swingable into and out of a position where it may be entered in the socket for releasable locking engagement therein.

11. A coupler assembly of the character described, comprising, in combination, a socket member having a socket and a ball receiving opening, a support for said socket member on one of two vehicles to be coupled, said socket being adapted to receive a ball head on the other of the vehicles to be coupled, means for releasably locking a ball head in said socket in swiveled relation to the socket member, a coupler hook on a vehicle to be coupled with the first mentioned vehicle, an eye member for detachable engagement on the hook, a ball head on the eye member extending therefrom in a direction for releasable locking engagement in the aforesaid socket to transmit the pull between the hook and socket support when the vehicles are coupled, an arm rigid with the eye member and ball head, means for pivotally supporting said arm on the socket member support so that the ball head is swingable into and out of a position where it may be entered in the socket for releasable locking engagement therein, and means for releasably securing the arm in substantially rigid relation to the socket member support in a retracted out-of-the-way position relative to the socket member.

12. A coupler assembly of the character described, comprising, in combination, a socket member having a socket and a ball receiving opening, a support for said socket member on one of two vehicles to be coupled, said socket being adapted to receive a ball head on the other of the vehicles to be coupled, means for releasably locking a ball head in said socket in swiveled relation to the socket member, a coupler hook on a vehicle to be coupled with the first mentioned vehicle, an eye member for detachable engagement on the hook, a ball head on the eye member extending therefrom in a direction for releasable locking engagement in the aforesaid socket to transmit the pull between the hook and socket support when the vehicles are coupled, an arm rigid with the eye member and ball head, and means for pivotally supporting said arm on the socket member support so that the ball head is swingable into and out of a position where it may be entered in the socket for releasable locking engagement therein, said pivoting means being constructed to permit limited endwise movement of the arm with respect to the socket member support so as to allow a corresponding lateral movement of the ball head with the arm relative to the socket member in the entry and removal of the ball head from the socket.

13. A coupler of the class described, comprising, in combination, a ball, a socket member having a socket and a ball receiving opening, the socket member also having an extension with a bore therein communicating with the socket and angularly disposed with respect to the direction of admission of the ball, a ball locking plunger slidable in said bore toward and away from engagement with the ball in the socket, said plunger restricting said opening while engaging the ball, whereby to prevent withdrawal thereof from the socket, a jack-screw disposed at the same angle as the plunger relative to the socket and threadedly engaged in a hole provided in said plunger extending longitudinally with respect thereto close to one side of the bore, said plunger having a longitudinally extending recess provided therein on the other side of the bore, and said socket member extension having a projection thereon extending toward the plunger and entering said recess, means for supporting the screw for rotation on the outer end of the socket member extension and against endwise movement with respect to said extension, and manually operable means for turning the screw.

14. A coupler as set forth in claim 13, wherein the projection on the socket member extension is at the inner end of the bore in said extension, and the inner end of said projection is conformed spherically to the curvature of the socket in the socket member and forms a continuation thereof so as to assume thrust of the ball thereon which would otherwise be transmitted from the ball to the plunger.

15. A coupler of the class described, comprising, in combination, a ball, a socket member having a socket and a ball receiving opening, the socket member also having an extension with a bore therein communicating with the socket and angularly disposed with respect to the direction of admission of the ball, a ball locking plunger slidable in said bore toward and away from engagement with the ball in the socket, said plunger restricting said opening while engaging the ball, whereby to prevent withdrawal thereof from the socket, a jack-screw disposed at the same angle as the plunger relative to the socket and threadedly engaged in a hole provided in said plunger extending longitudinally with respect thereto, said plunger having a longitudinally extending recess provided therein on one side of the bore, and said socket member extension having a projection thereon at the inner end of the bore extending toward the plunger and entering said recess, the inner end of said projection being conformed spherically to the curvature of the socket in the socket member and forming a continuation thereof so as to assume thrust of the ball thereon which would otherwise be transmitted from the ball to the plunger, means for supporting the screw for rotation on the outer end of the socket member extension and against endwise movement with respect to said extension, and manually operable means for turning the screw.

16. A coupler of the class described, comprising, in combination, a ball, a socket member having a socket and a ball receiving opening, the socket member also having an extension with a bore therein communicating with the socket and angularly disposed with respect to the direction of admission of the ball, a ball locking plunger slidable in said bore toward and away from engagement with the ball in the socket, said plunger restricting said opening while engaging the ball, whereby to prevent withdrawal thereof from the socket, a plate attached to the outer end of said extension closing the outer end of the bore, a shaft extending transversely with respect to the bore and mounted for rotation in said extension of the socket member in closely spaced parallel relation to said plate, a cam fixed on said shaft in said bore for rotation, means for manually turning the shaft, said plate providing an abutment surface on the inner side thereof, and said cam being formed for engagement with said surface when turned to a position holding the plunger in engagement with the ball in the socket, whereby thrust of the ball on the plunger is transmitted through the cam to said plate, and means providing abutments on said plunger for sliding engagement with the cam, one of said abutments coacting with the cam in the retracting movement of the plunger and the other abutment coacting with the cam in the opposite movement of the plunger and for positively limiting retracting movement of the plunger under thrust of the ball thereon.

17. A coupler assembly of the character described, comprising, in combination, a socket member having a socket and a ball receiving opening, a support for said socket member on one of two vehicles to be coupled, said socket being adapted to receive a ball head on the other of the vehicles to be coupled, means for releasably locking a ball head in said socket in swiveled relation to the socket member, a coupler hook on a vehicle to be coupled with the first mentioned vehicle, an eye for detachable engagement on the hook, a ball head for engagement in the aforesaid socket, and an arm forming a common support for the eye and ball head and carried on the first mentioned vehicle with the socket member, whereby to transmit pull from one vehicle to the other through said arm and through both the hook and ball head.

18. A coupler assembly of the character described, comprising, in combination, a socket member having a socket and a ball receiving opening, a support for said socket member on one of two vehicles to be coupled, said socket being adapted to receive a ball head on the other of the vehicles to be coupled, means for releasably locking a ball head in said socket in swiveled relation to the socket member, a coupler hook on a vehicle to be coupled with the first mentioned vehicle, an eye for detachable engagement on the hook, a ball head for engagement in the aforesaid socket, and an arm forming a common support for the eye and ball head and carried on the first mentioned vehicle with the socket member, whereby to transmit pull from one vehicle to the other through said arm and through both the hook and ball head, said arm being movable relative to the socket member to an inoperative position, and said ball head being releasable from locking engagement in said socket, whereby to permit engagement of another ball head on another vehicle in said socket so as to transmit pull between these vehicles independently of said arm, eye, and first mentioned ball head.

JAMES T. ATWOOD.